(12) United States Patent
Okada

(10) Patent No.: US 8,081,223 B2
(45) Date of Patent: Dec. 20, 2011

(54) IMAGING APPARATUS

(75) Inventor: Hiroyuki Okada, Osaka (JP)

(73) Assignee: Sony Corporation (JP)

( * ) Notice: Subject to any disclaimer, the term of this patent is extended or adjusted under 35 U.S.C. 154(b) by 485 days.

(21) Appl. No.: 12/288,061

(22) Filed: Oct. 15, 2008

(65) Prior Publication Data

US 2009/0128638 A1 May 21, 2009

(30) Foreign Application Priority Data

Oct. 25, 2007 (JP) ................ P2007-277172

(51) Int. Cl.
*H04N 5/228* (2006.01)

(52) U.S. Cl. .............. 348/208.7; 348/208.1; 348/208.2; 348/208.3; 348/208.4; 348/208.5; 348/208.6; 348/208.8; 348/208.11; 348/208.99

(58) Field of Classification Search ................. None
See application file for complete search history.

(56) References Cited

U.S. PATENT DOCUMENTS

2005/0128309 A1 * 6/2005 Tomita et al. .............. 348/208.7
2005/0276590 A1 12/2005 Ishikawa et al.

FOREIGN PATENT DOCUMENTS

JP 2004200951 A * 7/2004
JP 2006-003439 A 1/2006

* cited by examiner

*Primary Examiner* — Jason Chan
*Assistant Examiner* — Yih-Sien Kao
(74) *Attorney, Agent, or Firm* — Lerner, David, Littenberg, Krumholz & Mentlik, LLP

(57) ABSTRACT

An imaging apparatus includes: an imaging device for subjecting an optical subject image to photoelectric conversion to generate an image signal; an angular velocity sensor for detecting angular velocity with the imaging apparatus; a first shaking amount calculation unit for integrating detection values from the angular velocity sensor to calculate first shaking amount of the imaging apparatus; a second shaking amount calculation unit for calculating second shaking amount of the imaging apparatus based on image data from the imaging device; a third shaking amount calculation unit for correcting the first shaking amount to calculate third shaking amount of the imaging apparatus based on first amplitude which is a fluctuation range relating to the first shaking amount, and second amplitude which is a fluctuation range relating to the second shaking amount; and a correction control unit for correcting the shaking of the imaging apparatus based on the third shaking amount.

5 Claims, 7 Drawing Sheets

IMAGING APPARATUS

CROSS REFERENCE TO RELATED APPLICATION

The present application claims priority from Japanese Patent Application No. JP 2007-277172 filed in the Japanese Patent Office on Oct. 25, 2007, the entire content of which is incorporated herein by reference.

BACKGROUND OF THE INVENTION

1. Field of the Invention

The present invention relates to an imaging apparatus such as a digital camera or the like.

2. Description of the Related Art

There has been technology for correcting the shaking of an imaging apparatus by driving an imaging device and so forth of the imaging apparatus. With such shaking correction technology, there are technology employing an angular velocity sensor alone, and technology employing an acceleration sensor. Note that, with Japanese Unexamined Patent Application Publication No. 2006-3439, technology has been disclosed wherein shaking correction is performed by employing an angular velocity sensor and acceleration sensor.

SUMMARY OF THE INVENTION

Note that "shaking" includes "rotational shaking" and "parallel shaking". Note that "rotational shaking" is shaking occurring with the rotation of a lens upon a lens principal point, and "parallel shaking" is shaking occurring with the parallel movement of a lens. The details of both will be described later.

With the above-mentioned shaking correction technology employing an angular velocity sensor alone, it is difficult to correct the latter parallel shaking. On the other hand, this parallel shaking can also be corrected according to the shaking correction technology employing an acceleration sensor. However, in the case of employing an acceleration sensor, there is a problem such that the number of components increases, or it is difficult to calculate the movement amount from a detection value of the acceleration sensor precisely.

It has been realized that it is desirable to prove an imaging apparatus capable of correcting parallel shaking well without employing an acceleration sensor.

A first embodiment of the present invention is an imaging apparatus including: an imaging device configured to subject an optical subject image to photoelectric conversion to generate an image signal; an angular velocity sensor configured to detect angular velocity with the imaging apparatus; a first shaking amount calculation unit configured to integrate detection values obtained by the angular velocity sensor to calculate first shaking amount of the imaging apparatus; a second shaking amount calculation unit configured to calculate second shaking amount of the imaging apparatus based on image data obtained by the imaging device; a third shaking amount calculation unit configured to correct the first shaking amount to calculate third shaking amount of the imaging apparatus based on first amplitude which is a fluctuation range relating to the first shaking amount during a predetermined period, and second amplitude which is a fluctuation range relating to the second shaking amount during the predetermined period; and a correction control unit configured to correct the shaking of the imaging apparatus based on the third shaking amount.

According to the above configuration, parallel shaking can be corrected well without employing an acceleration sensor.

DESCRIPTION OF THE PREFERRED EMBODIMENTS

An embodiment of the present invention will be described below based on the drawings.

1. Configuration Overview

Figure 1:
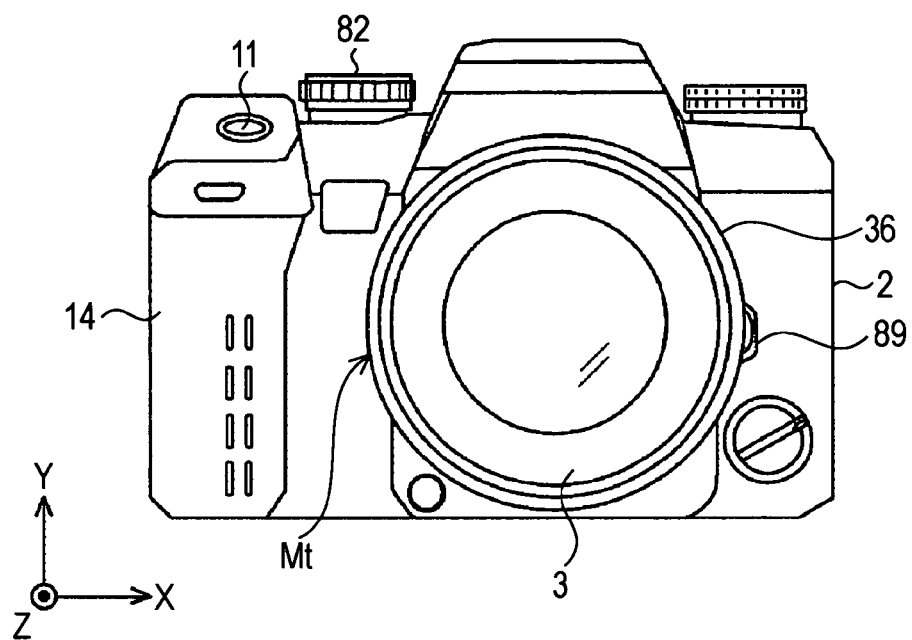
FIG. 1 is a front face external view of an imaging apparatus.
Figure 2:
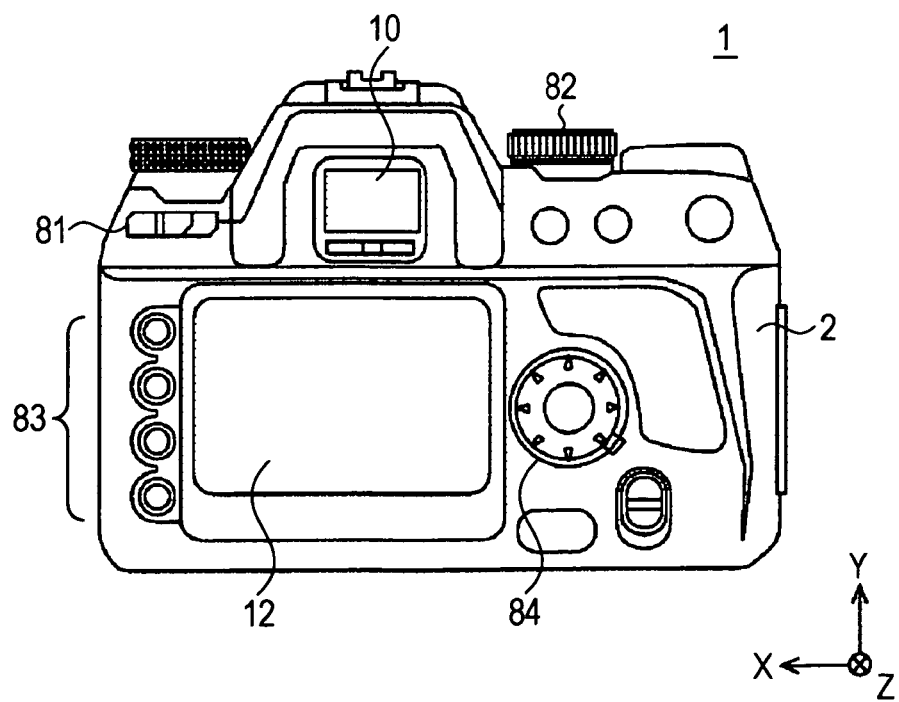
FIG. 2 is a rear face external view of the imaging apparatus.

FIGS. 1 and 2 are diagrams illustrating an imaging apparatus 1 according to an embodiment of the present invention. FIG. 1 is a front face external view of the imaging apparatus 1, and FIG. 2 is a rear face external view of the imaging apparatus 1. The imaging apparatus 1 is configured as a single-lens reflex digital camera with interchangeable lenses.

As shown in FIG. 1, the imaging apparatus 1 includes a camera body portion (camera body) 2. An interchangeable photography lens unit (interchangeable lens) 3 is detachable as to the camera body portion 2. The photography lens unit 3 is principally configured of a camera cone 36, a lens group 37 (see FIG. 3) provided within the camera cone 36, a diaphragm, and so forth. The lens group 37 includes a focus lens for changing a focal position by moving in the optical axis direction, and so forth.

The camera body portion 2 includes a ring-shaped mounting portion Mt on which the photography lens unit 3 is mounted, generally on the center of the front face, and includes a detachment button 89 for mounting/detaching the photography lens unit 3 at the ring-shaped mounting portion Mt. Also, the camera body portion 2 includes a mode setting dial 82 on the left upper portion of the front face thereof, and a control value setting dial 86 on the right upper portion of the front face thereof. The setting operation (switching operation) of various types of mode (including various types of shooting mode, playback mode for playing a shot image, communication mode for performing data communication with an external device, and so forth) of the camera can be performed by operating the mode setting dial 82.

Also, the camera body portion 2 includes a grip portion 14 gripped by a cameraman on the left end portion on the front face. There is provided a release button 11 for instructing start of exposure is provided on the upper face of the grip portion 14. A battery housing chamber and card housing chamber are provided within the grip portion 14. A battery, for example, such as a lithium-ion battery or the like is stored in the battery housing chamber as the power source of the camera, and a memory card 90 (see FIG. 3) for recording the image data of a shot image is detachably stored in the card housing chamber.

The release button 11 is a two-step detection button capable of two states of a half-pressed state Si and full-pressed state S2. The release button 11 accepts a shooting preparation command D1 and shooting start command D2 according to the detection results of both states S1 and S2. Upon the release button 11 being half-pressed to the half-pressed state S1, the imaging apparatus 1 determines that the shooting preparation command (also referred to as exposure preparation command) D1 has been provided by an operator. Subsequently, in response to the shooting preparation command D1, preparation operation for obtaining a still image for recording (main photography) relating to a subject (e.g., AF control operation, AE control operation, and so forth) is performed.

Also, upon the release button 11 further being pressed to the full-pressed state S2, the imaging apparatus 1 determines that the shooting start command (also referred to as exposure start command) D2 has been provided. Subsequently, in response to the shooting start command D2, the shooting operation of this main shot image (a series of operations wherein exposure operation relating a subject image (optical subject image) is performed with an imaging device 5, and an image signal obtained by the exposure operation thereof is subjected to predetermined image processing) is performed.

In FIG. 2, a viewfinder window (eyepiece window) 10 is provided generally on the center upper portion of the rear face of the camera body portion 2. The cameraman can determine a picture composition while visually recognizing an optical subject image derived from the photography lens unit 3 by peeking through the viewfinder window 10. That is to say, a picture composition can be determined with an optical viewfinder.

In FIG. 2, a rear-face monitor 12 is provided generally on the center of the rear face of the camera body portion 2. The rear-face monitor 12 is configured, for example, as a color liquid crystal display (LCD). The rear-face monitor 12 can display a menu screen for setting a shooting condition or the like, and in playback mode can play and display the shot image recorded in the memory card 90.

A main switch 81 is provided on the left upper portion of the rear-face monitor 12. The main switch 81 is made up of a two-point slide switch, wherein upon the contact being set to "OFF" position on the left hand, the power is turned off, and upon the contact being set to "ON" position on the right hand, the power is turned on.

A direction selection key 84 is provided on the. right side of the rear-face monitor 12. This direction selection key 84 includes a circular operating button, and is configured so as to detect pressing operation in the four directions of vertical and horizontal directions of this operating button, and pressing operation in the four directions of right upper, left upper, left lower, and left lower directions. Note that the direction selection key 84 can detect the pressed operation of a push button on the center portion separately from the pressing operation on in the above-mentioned eight directions.

A setting button group 83 made up of multiple buttons for setting a menu screen, elimination of an image, or the like is provided on the left side of the rear-face monitor 12.

2. Functional Blocks

Figure 3:
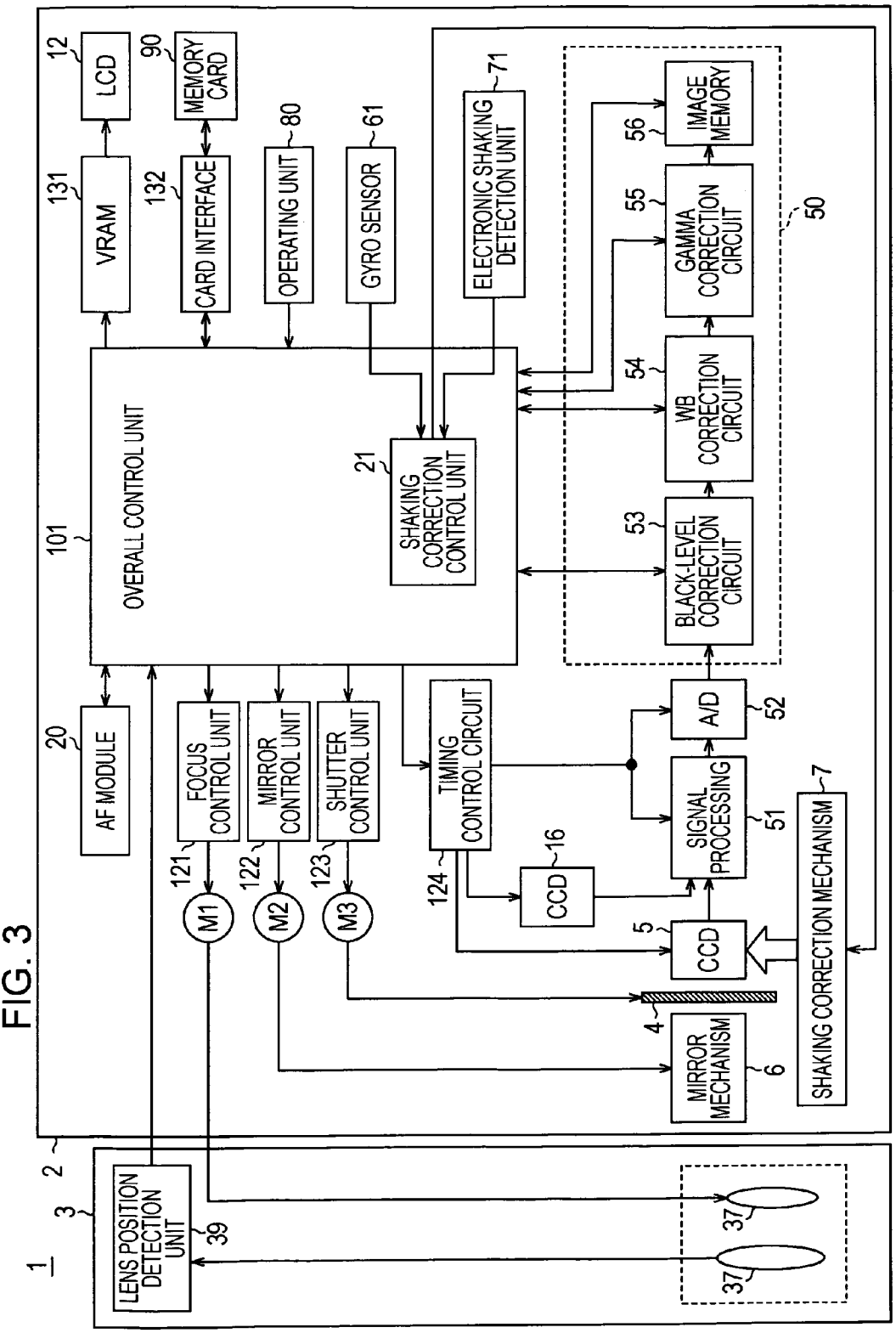
FIG. 3 is a block diagram illustrating the functional configuration of the imaging apparatus.

Next, description will be made regarding the brief overview of the functions of the imaging apparatus 1 with reference to FIG. 3. FIG. 3 is a block diagram illustrating the functional configurations of the imaging apparatus 1. As shown in FIG. 3, the imaging apparatus 1 includes an operating unit 80, overall control unit 101, focus control unit 121, mirror control unit 122, shutter control unit 123, timing control circuit 124, digital signal processing circuit 50, and so forth.

The operating unit 80 is configured so as to include various types of buttons and switches including the release button 11 (see FIG. 1). In response to input operations of the user as to the operating unit 80, the overall control unit 101 realizes various types of operation.

The overall control unit 101 is configured as a microcomputer, and principally includes CPU, memory, ROM, and so forth. The overall control unit 101 reads out programs stored in the ROM, and executes the programs by the CPU, thereby realizing various types of functions.

The overall control unit 101 realizes the respective processing units including a shaking correction control unit 21. The shaking correction control unit 21 has a function to drive the imaging device 5 using a shaking correction mechanism 7 (described later), and optically correct shaking detected by an angular velocity sensor (gyro sensor) 61 or the like. Also, the shaking correction mechanism 7 (see FIG. 4) includes a position sensor for detecting for a position in the x direction and a position in the Y direction of the imaging device 5, and the shaking correction control unit 21 employs the detection result from the position sensor to control the position of the imaging device 5 in accordance with a feedback control rule or the like.

Also, the overall control unit 101 collaborates with an AF module 20, focus control unit 121, and so forth to perform focus control operation for controlling the position of a focus lens. The overall control unit 101 employs the focus control unit 121 to realize automatic focus operation (AF operation) in accordance with the focus state of a subject detected by the AF module 20. Note that the AF module 20 can detect the focus state of a subject with a focus state detection method such as a phase difference system or the like by employing light input through a mirror mechanism 6.

The focus control unit 121 generates a control signal based on a signal input from the overall control unit 101 to drive a motor M1, thereby moving a focus lens included in a lens group 37 of the photography lens unit 3. Also, the position of the focus lens is detected by a lens position detection unit 39 of the photography lens unit 3, and data showing the position of the focus lens is transmitted to the overall control unit 101. Thus, the focus control unit 121, overall control unit 101, and so forth control the operation in the optical axis direction of the focus lens.

The mirror control unit 122 controls the state switching between a state in which the mirror mechanism 6 is evacuated from an optical path (mirror-up state), and a state in which the mirror mechanism 6 shuts out the optical path (mirror-down state). The mirror control unit 122 generates a control signal based on a signal input from the overall control unit 101 to drive the motor M2, thereby switching the mirror-up state and mirror-down state.

Note that the mirror mechanism 6 has a principal mirror (principal reflecting surface) and sub mirror (sub reflecting surface). In the mirror-down state, the principal mirror and sub mirror of the mirror mechanism 6 are disposed on the optical path of the optical flux. Subsequently, the optical flux (subject image) from the photography lens unit 3 is reflected to the camera upper portion side at the principal mirror, further reflected with a penta mirror disposed on the upper portion of the camera body portion 2, and guided to the viewfinder window 10 as an optical flux for observation. Also, a part of the optical flux from the photography lens unit 3 is reflected at the sub mirror, guided to the AF module 20 disposed at the lower portion of the camera body portion 2, and employed for AF operation. On the other hand, in the mirror-up state, the principal mirror and sub mirror are evacuated from the optical path of a subject image from the photography lens unit 3, and the subject image advances toward a shutter 4 and imaging device 5.

The shutter control unit 123 generates a control signal based on a signal input from the overall control unit 101 to drive the motor M3, thereby controlling opening/closing of the shutter 4. Note that in a state wherein the shutter 4 is opened, a subject image reaches the imaging device 5, thereby realizing exposure operation during an exposure period. The timing control circuit 124 performs timing control as to the imaging device 5 and so forth.

The imaging device 5 subjects an optical subject image to photoelectric conversion to generate an image signal. In detail, the imaging device (here, CCD sensor (also simply referred to CCD)) 5 converts a subject optical image into an electric signal with photoelectric conversion to generate an image signal (image signal for recording) according to the main shot image.

In response to a driving control signal (accumulation start signal and accumulation end signal) input from the timing control circuit 124, the imaging device 5 subjects a subject image formed on a light reception face to exposure (charge accumulation by photoelectric conversion) to generate an image signal relating to the subject image. Also, in response to a readout control signal input from the timing control circuit 124, the imaging device 5 outputs the image signal to a signal processing unit 51. Also, a timing signal (synchronizing signal) from the timing control circuit 124 is also input to the signal processing unit 51 and an A/D (Analog/Digital) conversion circuit 52.

The image signal obtained at the imaging device 5 is subjected to predetermined analog signal processing at the signal processing unit 51, and the image signal after the analog signal processing is converted into digital image data (image data) by the A/D conversion circuit 52. This image data is input to the digital signal processing circuit 50.

The digital signal processing circuit 50 subjects the image data input from the A/D conversion circuit 52 to digital signal processing to generate this into image data relating to an imaged image. The digital signal processing circuit 50 includes a black-level correction circuit 53, white balance (WB) circuit 54, gamma correction circuit 55, and image memory 56.

The black-level correction circuit 53 corrects the black level of each pixel data making up the image data output from the A/D conversion circuit 52 to a reference black level. The WB circuit 54 subjects the image data to white balance adjustment. The gamma correction circuit 55 subjects the imaged image to gray scale conversion. The image memory 56 is image memory, which can be accessed at high speed, for temporarily storing the generated image data, and having memory capacity to store multiple frames worth of image data.

At the time of the main shooting, the image data temporarily stored in the image memory 56 is subjected to image processing (including compression processing or the like) at the overall control unit 101, and is then stored in the memory card 90 through a card interface 132.

Also, the image data temporarily stored in the image memory 56 is transferred to VRAM 131 by the overall control unit 101 as appropriate, and an image based on the image data is displayed on the rear-face monitor 12. Thus, confirmation display (after view) for confirming a shot image, playback display for playing a shot image, and so forth can be realized.

Also, the imaging device 5 is driven by the shaking correction control unit 21 and shaking correction mechanism 7. In detail, the imaging device 5 is driven so as to cancel out shaking detected by the angular velocity sensor 61 or the like. Thus, the shaking at the imaging apparatus is corrected.

3. Shaking Correction Mechanism

Next, the shaking correction mechanism 7 will be described. The shaking correction mechanism 7 is a mechanism for driving the imaging device 5 to correct the shaking of the imaging apparatus 1 (imaging device 5).

Figure 4:
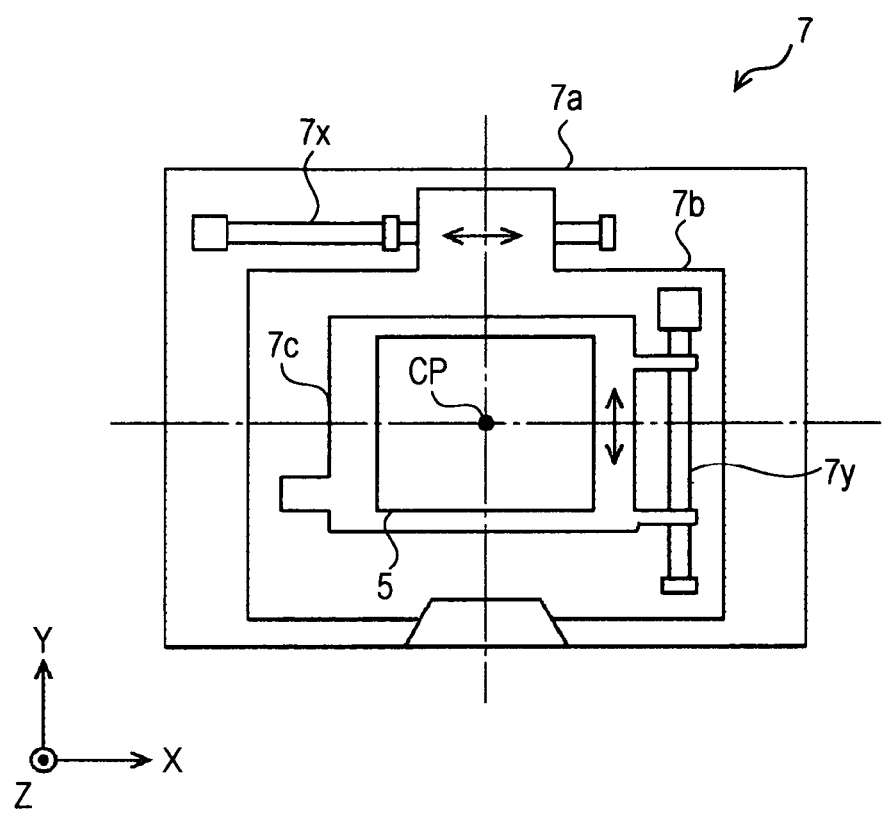
FIG. 4 is a diagram illustrating the schematic configuration of a shaking correction mechanism.

FIG. 4 is a diagram illustrating the schematic configuration of the shaking correction mechanism 7. The shaking correction mechanism 7 includes a base portion 7a, first movement portion 7b, and second movement portion 7c.

The base portion 7a is fixed to around the rear face portion within the camera body portion 2. Also, the first movement portion 7b can move in the X direction as to the base portion 7a, and the second movement portion 7c can move in the Y direction as to the first movement portion 7b. The imaging device 5 is fixed to the second movement portion 7c.

The base portion 7a includes an actuator 7x. The actuator 7x is a driving mechanism called as SIDM (Smooth Impact Drive Mechanism). The SIDM is configured so as to include a piezoelectric element. The piezoelectric element repeats expansion and contraction operations at a fast frequency, whereby the actuator 7x can move the first movement portion 7b in the X direction as to the base portion 7a.

The first movement portion 7b includes an actuator 7y. The actuator 7y is also configured of the same SIDM as the actuator 7x. A piezoelectric element of the actuator 7y repeats expansion and contraction operations at a fast frequency, whereby the actuator 7y can move the second movement portion 7c in the Y direction as to the first portion 7b.

As described above, the imaging device 5 fixed to the second movement portion 7c can move relatively in the X direction and Y direction as to the base portion 7a by using the actuators 7x and 7y.

Subsequently, the imaging device 5 is moved as to the base portion 7a based on a signal detected by the angular velocity sensor 61 or the like, whereby the shaking of the imaging apparatus 1 can be prevented, i.e., shaking correction can be performed.

Note that, though not shown in the drawing, an electric connection terminal portion provided on the imaging device 5 side, and an electric connection terminal portion provided on the base portion 7a side are electrically connected with a flexible substrate or the like. The electric signal (image signal) obtained by the imaging device 5 is transmitted to the digital signal processing circuit 50 and the like on the camera body portion 2 side by the flexible substrate.

4. Imaging Device for Live View

Also, the imaging apparatus 1 further includes another imaging device (e.g., CCD) 16 (FIG. 3) different from the above-mentioned image device 5. This imaging device 16 also subjects an optical subject image to photoelectric conversion to generate an image signal. However, the imaging device 16 serves as a so-called imaging device for obtaining a live view image (for obtaining a moving image). Here, a "live view image" is a time-series image relating to a subject, and is an image to be sequentially displayed on a display unit such as a liquid crystal display unit or the like, and is, in other words, an image for displaying a subject in a moving image mode.

The imaging device 16 is provided within the upper portion space of the camera body portion 2. The optical path of the optical flux for observation reflected upward at the principal mirror of the mirror mechanism 6 in a mirror-down state passes through a pentaprism and so forth, and is then divided by an optical element (beam splitter or the like) provided within the upper portion space of the camera body portion 2, and a part of the optical flux for observation reaches the imaging device 16. Note that another part of the optical flux for observation reaches the eyes of an observer through the viewfinder window 10.

Multiple images obtained by imaging an optical image received at the imaging device 16 with a minute time interval are sequentially displayed on the rear-face monitor 12. Thus, an image (live view image) in the moving image mode is obtained. The operator observes a live view image displayed on the rear-face monitor 12, whereby a picture composition relating to a subject can be determined.

The imaging device 16 has the same configuration as the imaging device 5. However, the imaging device 16 is configured of fewer pixels than the imaging device 5 as long as the imaging device has resolution for generating an image signal for live view (moving image).

The image signal obtained by the imaging device 16 is also subjected to the same signal processing as that performed on the image signal obtained by the imaging device 5. That is to say, the image signal obtained by the imaging device 16 is subjected to predetermined processing at the signal processing unit 51, converted into digital data at the A/D conversion circuit 52, subjected to predetermined image processing at the digital signal processing circuit 50, and stored in the image memory 56.

Also, the time-series image data obtained at the imaging device 16 and stored in the image memory 56 is sequentially transferred to the VRAM 131 by the overall control unit 101, and an image based on the time-series image data is displayed on the rear-face monitor 12. Thus, display in the moving image mode (live view display) for determining a picture composition is realized.

As described later, with this embodiment, description will be made regarding technology for correcting a shaking signal obtained by the angular velocity sensor 81 by using image data obtained by such an imaging device 16 for live view.

5. Shaking Correction Control System

Figure 5:
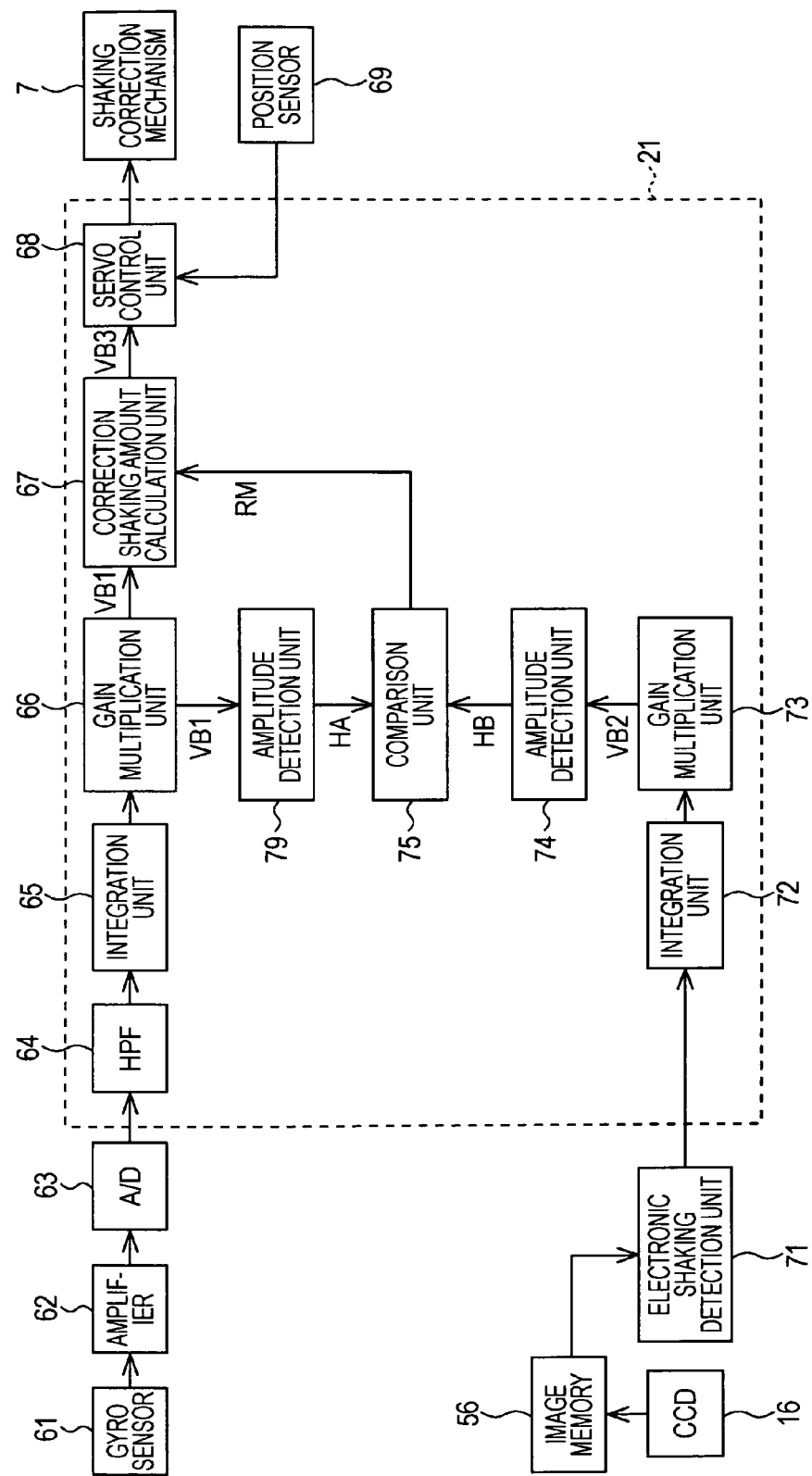
FIG. 5 is a conceptual view illustrating a control system relating to shaking correction control.

FIG. 5 is a conceptual view illustrating a control system relating to shaking correction control. The imaging apparatus 1 includes two control systems relating to mutually different directions. One of the control systems detects shaking in the X direction of the imaging device 5 based on the angular velocity in the yaw direction of the imaging apparatus 1, and drives the imaging device 5 in the X direction so as to cancel out the shaking in the X direction. Also, the other control system detects shaking in the Y direction of the imaging device 5 based on the angular velocity in the pitch direction of the imaging apparatus 1, and drives the imaging device 5 in the Y direction so as to cancel out the shaking in the Y direction.

In FIG. 5, the above-mentioned two control systems are illustrated collectively. Description will be made collectively below regarding these two control systems, but in reality operations in the two (X and Y) control systems are executed individually.

Each of the controls systems includes an angular velocity sensor (gyro sensor) 61, amplifier 62, A/D conversion unit 63, high-pass filter (HPF) 64, integration unit 65, gain multiplication unit 66, correction shaking amount calculation unit 67, and servo control unit 68.

The angular velocity sensor 61 is fixed to the camera body portion 2, and outputs a signal according to angular velocity in the predetermined rotational direction (e.g., yaw direction) of the camera body portion 2. That is to say, the angular velocity sensor 61 detects the angular velocity of the imaging apparatus 1. The output signal (detection signal) of the angular velocity sensor 61 is amplified at the amplifier 62, and converted into a digital signal at the A/D conversion unit 63. The angular velocity signal converted into a digital signal is further integrated at the integration unit 65, thereby being generated as a signal (data) indicating a "shaking angle".

Also, the "shaking angle" output from the integration unit 65 is subjected to multiplication processing with a predetermined gain at the gain multiplication unit 66, and is converted into shaking amount VB1 on the imaging device 5.

Thus, the detection value (angular velocity) by the angular velocity sensor 61 is integrated to calculate the shaking amount VB1. Also, the shaking amount VB1 is further corrected to shaking value VB3 by the correction shaking amount calculation unit 67. This correction operation will be described later.

Subsequently, based on the shaking amount VB3 calculated by the correction shaking amount calculation unit 67, and the position in a predetermined direction (X direction or Y direction) of the imaging device 5 detected by the position detection sensor 69, the servo control unit 68 determines the driving amount in the predetermined direction to cancel out the shaking of the shaking amount VB3, and drives the shaking correction mechanism 7 by a driving signal corresponding to the driving amount. That is to say, the servo control unit 68 performs driving control for driving the imaging device 5 based on the shaking amount VB3 for shaking correction to correct the shaking of a subject image on the light reception face of the imaging device 5.

Now, let us assume a case wherein shaking correction is performed based on the shaking amount VB1 output from the gain multiplication unit 66 without performing correction operation at the correction shaking amount calculation unit 67, and in detail, a case wherein shaking correction operation for cancelling out the shaking amount VB1 is performed. In this case, there is a problem wherein "rotational shaking" can be corrected, but it is difficult to correct "parallel shaking", and description will be made in detail regarding this.

FIGS. 6 through 10 are diagrams for describing shaking operation. Note here that the lens group 37 of the photography lens unit 3 is represented with a single lens LS to simplify description.

Figure 6:
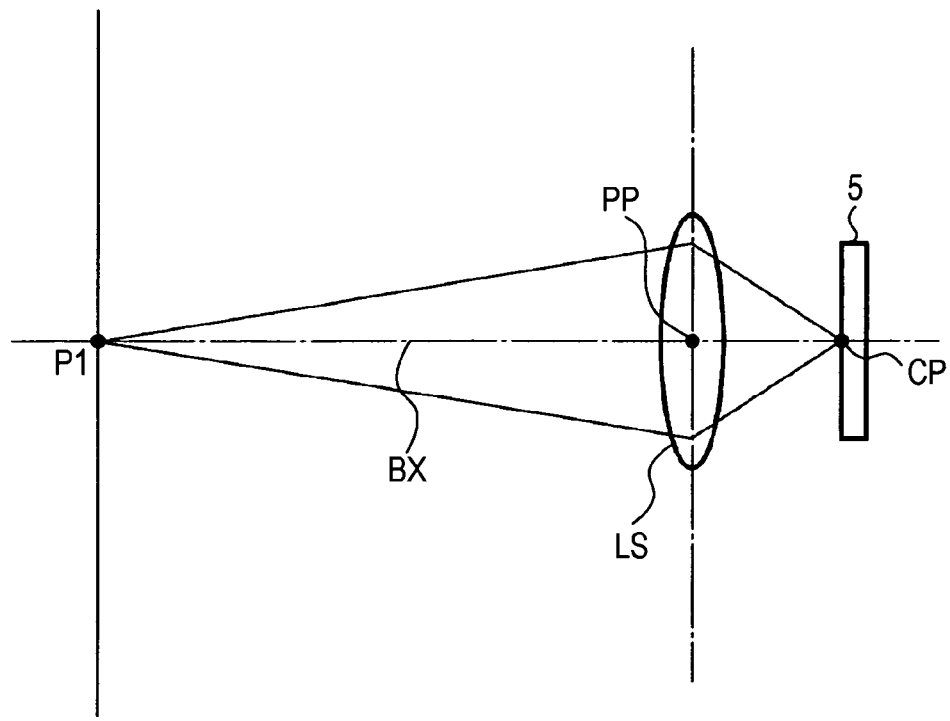
FIG. 6 is a diagram for describing shaking operation.
Figure 7:
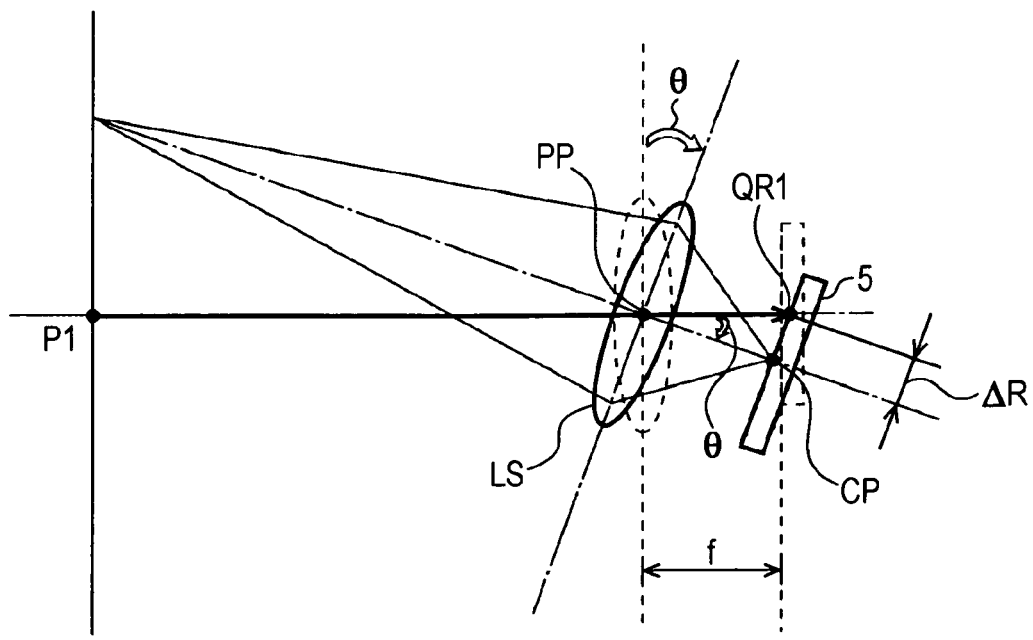
FIG. 7 is a diagram for describing shaking operation (rotational shaking alone)

As shown in FIGS. 6 and 7, "rotational shaking" is the shaking of a subject on the imaging device due to operation wherein the lens LS rotates in a predetermined direction (e.g., yaw direction) with a lens principal point (principal point on the rear side) PP as the center.

FIG. 7 illustrates a situation wherein the imaging apparatus 1 (specifically, lens LS, imaging device 5, and so forth) rotates around the lens principal point PP by a predetermined angle θ (within the plane of the drawing) as to the state in FIG. 6. In FIG. 6, a point P1 on a subject imaged on the center point CP of the imaging device 5 is imaged, after the rotation, as shown in FIG. 7, on a position QR1 shifted from the center point CP by distance ΔR with the imaging face of the imaging device 5. Also, at this time, the shaking amount ΔR of rotational shaking is calculated by multiplying the shaking angle θ calculated by the gain multiplication unit 66 by a gain G equivalent to a focal length f. That is to say, the shaking amount ΔR of rotational shaking is calculated as $\Delta R = f \times \theta$. This value $\Delta R$ is ideally equal to the shaking amount VB1.

Figure 8:
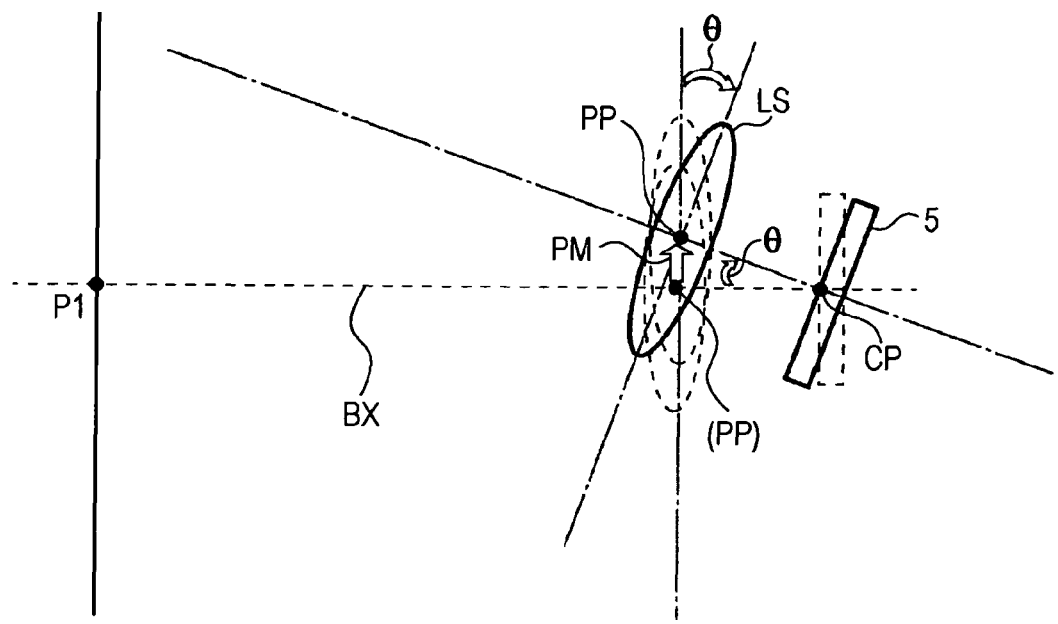
FIG. 8 is a diagram for describing shaking operation (including both rotational shaking and parallel shaking)

However, the rotation center of shaking such as common hand shaking frequently shifts from the lens principal point PP. For example, as shown in FIG. 8, let us assume a case wherein the rotation center of shaking is a point CP (a central point on the imaging face which is a point shifted to the right side from the lens principal point PP). When the lens LS (and imaging device 5) rotates on the point CP, the lens LS moves by with not only rotational components but also parallel movement components. Specifically, the movement operation of the lens LS at the time of rotating on the point CP is generally equivalent to operation wherein parallel movement (movement amount PM) wherein the entire lens LS moves upward within the plane of the drawing in parallel, and rotation movement (rotation angle $\theta$) wherein the lens LS rotates around the lens principal point PP are synthesized. Thus, with the lens LS, rotation movement around the principal point PP, and parallel movement advancing upward within the plane of the drawing occur. Therefore, with a subject image imaged on the imaging device 5 through the lens LS, not only "rotational shaking" with rotation movement but also "parallel shaking" with parallel movement occur.

Figure 9:
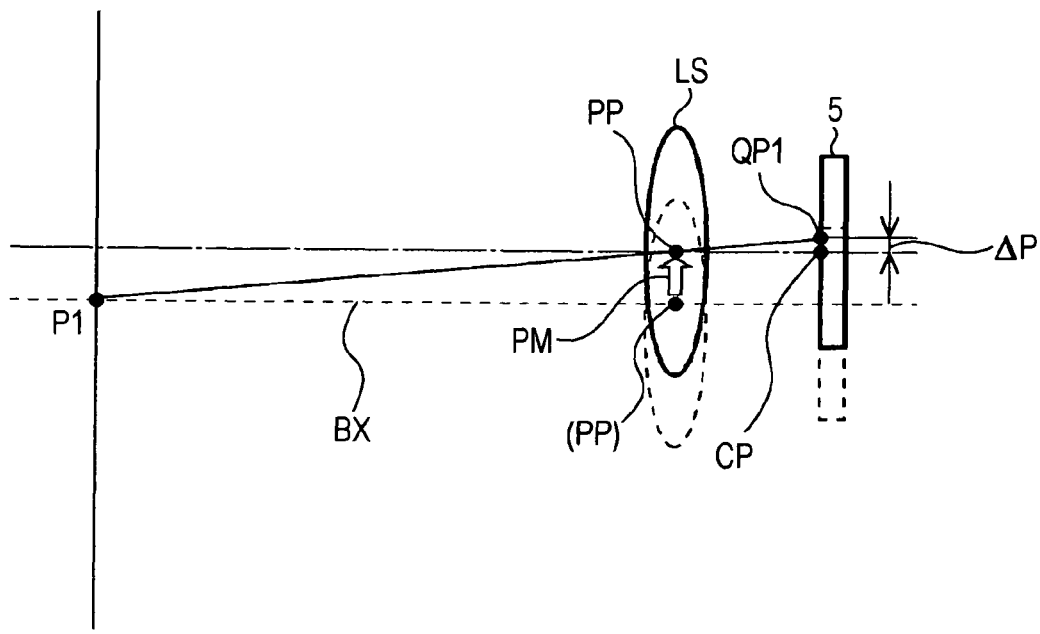
FIG. 9 is a diagram for describing shaking operation (parallel shaking alone)

FIG. 9 is a diagram illustrating parallel shaking. As shown in FIG. 9, "parallel shaking" is the shaking of a subject on the imaging device caused due to operation wherein the lens LS moves in parallel as to a perpendicular plane with an optical axis BS (FIG. 6) of the lens LS before movement as an normal line (e.g., parallel movement operation advancing upward within the plane of the drawing).

FIG. 9 illustrates a situation wherein the imaging apparatus 1 (specifically, photography lens, imaging device 5, and so forth) moves upward in parallel by certain amount PM (within the plane of the drawing) as to the state shown in FIG. 6. In FIG. 6, the point P1 on the subject imaged on the center point CP of the imaging device 5 is, as shown in FIG. 9, imaged on the position QP1 shifted from the center point CP by distance $\Delta P$ with the imaging face of the imaging device 5. This value $\Delta P$ is the shaking amount of parallel shaking. Note that the shaking amount $\Delta P$ of parallel shaking is represented as $\Delta P = \beta \times PM$ by employing image magnification $\beta$ (=focal length/subject distance=f/L) and the parallel movement amount PM of the lens LS. For example, when a subject exists at infinity, this value $\Delta P$ is 0 (zero), but on the other hand, when the subject exists relatively nearby (i.e., when the subject distance L is relatively small), the image magnification $\beta$ becomes relatively great, and the value $\Delta P$ becomes a relatively great value. Also, even at the time of telephoto shooting, the image magnification $\beta$ becomes relatively great, and the value $\Delta P$ becomes a relatively great value.

Figure 10:
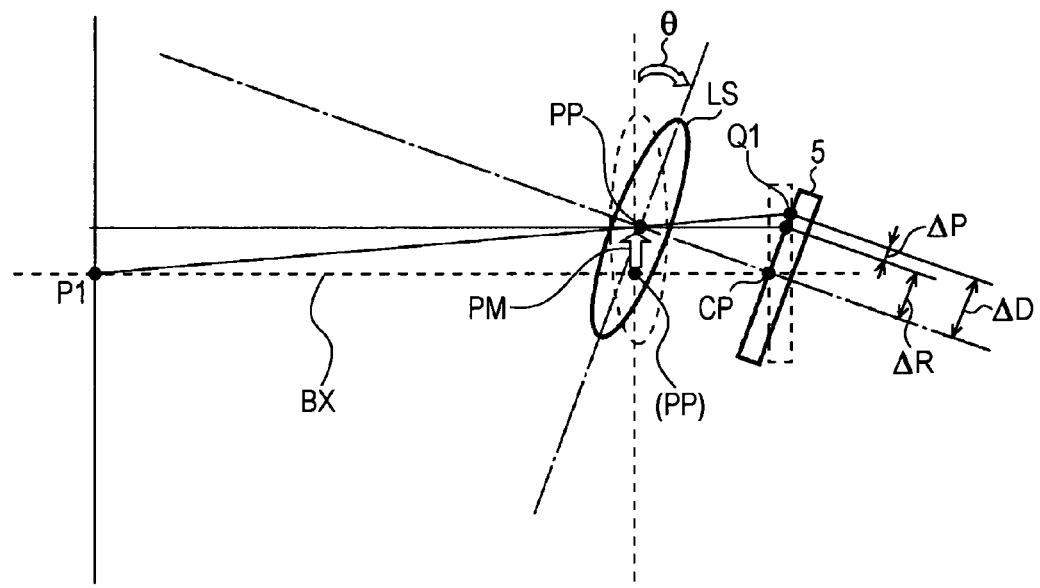
FIG. 10 is a diagram for describing shaking operation (including both of rotational shaking and parallel shaking)

As described above, upon rotation operation such as shown in FIG. 8 being performed, the state is changed to a state wherein parallel movement such as shown in FIG. 9 has been performed, and also rotation movement such as shown in FIG. 7 has further been performed, i.e., a state wherein the synthesized movement between the parallel movement and rotation movement has been performed. FIG. 10 illustrates a state wherein such synthesized movement has been performed. Note that FIG. 10 illustrates the same state as in FIG. 8.

As shown in FIG. 10, in a case wherein both of rotation movement and parallel movement occur, the point P1 on the subject (imaged on the center point CP of the imaging device 5 in FIG. 6) is imaged on a position Q1 (=QP1). Subsequently, the shaking amount on the imaging device 5 at this time becomes a value $\Delta D$ ($=\Delta R + \Delta P$) obtained by further adding $\Delta P$ to the shaking amount $\Delta R$ of the rotational shaking shown in FIG. 7.

However, if we say that shaking correction is performed wherein the shaking amount VB1 based on the detection angle $\theta$ by the angular velocity sensor 61 is cancelled out, of the above-mentioned "rotational shaking" and "parallel shaking", not both but the "rotational shaking" alone can be corrected. This is because only the detection angle $\theta$ by the angular velocity sensor 61 is cancelled out, but the parallel movement component PM is not cancelled out.

Therefore, with the imaging apparatus 1 according to the present embodiment, as described below, shaking correction is performed such that the shaking amount VB3 including parallel shaking is obtained by employing a live view image obtained by the imaging device 16 or the like, thereby cancelling out the shaking amount VB3. Thus, more excellent shaking correction can be performed.

Note that it can be conceived in a conceptual manner to constantly obtain shaking amount including parallel shaking by employing a live view image. However, with the imaging apparatus 1 according to the present embodiment, at the time of exposure for obtaining the main shot image (shortly put, at the time of obtaining the main shot image), the mirror mechanism 6 assumes a mirror-up state, no subject image reaches the imaging device 16, and accordingly, no live view image can be obtained. Therefore, it is difficult to directly employ the live view image for shaking correction at the time of shooting of the main shot image. Accordingly, it is desirable to perform operation such as described in the following.

First, the imaging apparatus 1 according to the present embodiment employs the angular velocity sensor 61 to obtain the shaking amount (rotational shaking amount, in detail) VB1 at the time of shooting of the main shot image. Specifically, the imaging apparatus 1 according to the present embodiment calculates the shaking amount VB1 (equivalent to $\Delta R$) relating to the rotational shaking of the imaging apparatus 1 by integrating detection values obtained by the angular velocity sensor 61 (see FIG. 5).

Also, the imaging apparatus 1 employs a time-series image for live view obtained by the imaging apparatus 16 before obtaining of the main shot image to calculate the shaking amount VB2. Specifically, based on the image data (live view image) obtained by the imaging device 16, the shifting of the same subject of multiple (two or more) time-series shot images, i.e., the shaking amount VB2 (equivalent to $\Delta D$) is calculated with various types of technique such as the "motion vector method" or the like. Note that both of the components of the rotational shaking ($\Delta R$) and parallel shaking ($\Delta P$) are included in this shaking amount VB2 (equivalent to $\Delta D$).

Further, the imaging apparatus 1 obtains the relation between the shaking amount VB1 ($\Delta R$) of rotational shaking detected by the angular velocity sensor 61, and the shaking amount VB2 ($\Delta D$) detected based on a live view image.

For example, the imaging apparatus 1 obtains the relation between the shaking amount VB1 detected by the angular velocity sensor 61, and the shaking amount VB2 detected based on a live view image based on a value (also referred to as "amplitude ratio") RM (=HB/HA) representing the ratio between a fluctuation range (amplitude) HA relating to the shaking amount $\Delta R$ within a predetermined period, and a fluctuation range (amplitude) HB relating the shaking amount $\Delta D$ within the predetermined period. Now, let us say that the amplitude ratio RM between the shaking amount VB1 ($\Delta R$) of rotational shaking and the shaking amount VB2 ($\Delta D$) of a live view image is constant at each point-in-time, and the shaking amount VB2 is equal to a value obtained by multiplying the shaking amount VB1 by the amplitude ratio RM, i.e., VB2=VB1×RM. In other words, a value obtained by multiplying the rotational shaking VB1 by the value RM is calculated as shaking amount obtained by synthesizing rotational shaking and parallel shaking.

Figure 11:
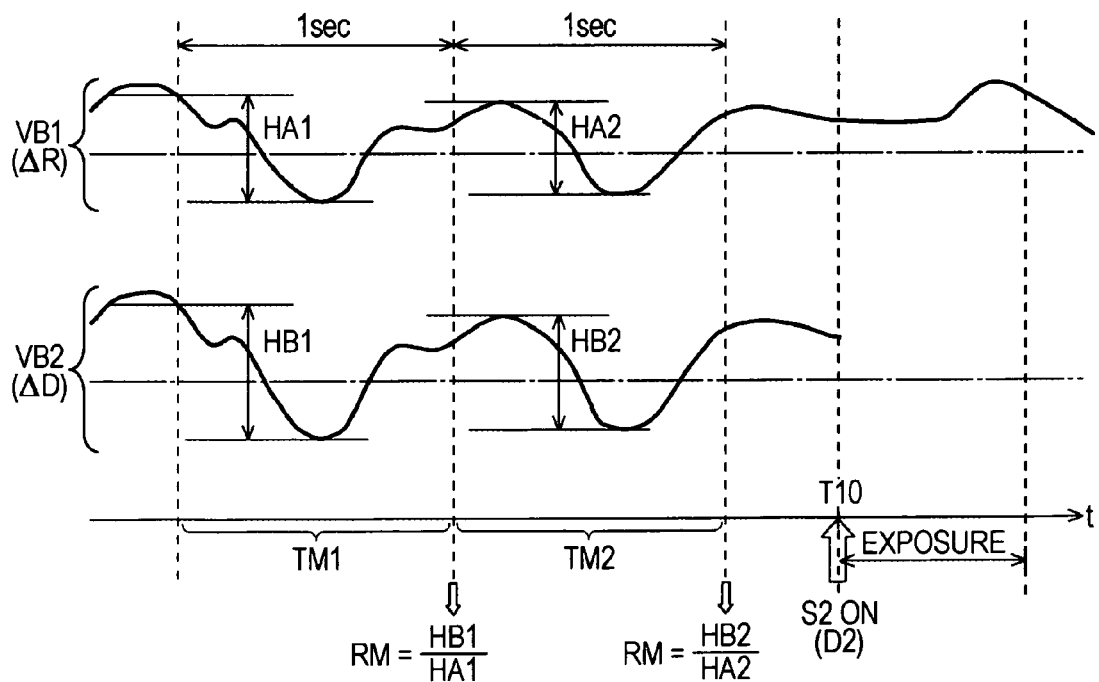
FIG. 11 is a diagram illustrating a shaking amount $\Delta R$ obtained by an angular velocity sensor, and shaking amount $\Delta D$ based on image data obtained by an imaging device.

Specifically, as shown in FIG. 11, with a stage for determining a picture composition, amplitude HA and amplitude HB are obtained for each predetermined cycle (e.g., cycle length TS=1 second) regarding the signal of the shaking amount VB1 (ΔR) by the angular velocity sensor 61, and the signal of the shaking amount VB2 (ΔD) based on the image data by the imaging device 16, respectively. At this time, the value (HB/HA) relating to the ratio between the amplitude HA and amplitude HB for each period TM is obtained as the value RM. Note that FIG. 11 illustrates the case of RM>1.

For example, the amplitude HA1 and HB1 are obtained during a period TM1, and amplitude HA2 and HB2 are obtained during a period TM2, respectively. At this time, a value (HB1/HA1) relating to the ratio between the amplitude HA1 and amplitude HB1 is calculated as a value RM (RM1). Also, a value (HB2/HA2) relating to a ration between the amplitude HA2 and amplitude HB2 is calculated as a value RM (RM2).

Note that the value RM is also represented as an evaluation value indicating how many times the original shaking amount ΔD to which the deficient shaking amount ΔP due to parallel shaking is added is greater than the shaking amount ΔR detected by the angular velocity sensor 61.

Subsequently, the imaging apparatus 1 obtains the shaking amount VB3 based on the relation. Specifically, the shaking amount (specifically, shaking amount obtained by synthesizing rotational shaking and parallel shaking) VB3 at the time of exposure of a shot image is estimated as a value obtained by changing (increasing) the shaking amount VB1 based on the angular velocity sensor 61 with the same magnification as the magnification represented with the amplitude ratio RM before exposure of a shot image. Let us say that this shaking amount VB3 is represented with VB3=VB1×RM. Thus, the shaking amount VB1 detected by the angular velocity sensor 61 is corrected according to the amplitude ratio RM between the amplitude HA and amplitude HB during a predetermined period, thereby calculating the shaking value VB3 at the time of obtaining the main shot image of the imaging apparatus 1.

Further, the imaging apparatus 1 corrects the shaking of the imaging apparatus 1 based on the shaking amount ΔD (VB3). At this time, of multiple values RM obtained during multiple periods TM (specifically, TM1, TM2, and so on), it is desirable to perform shaking correction at the time of exposure by employing the latest value RM obtained during a period (e.g., TM2) immediately before exposure.

Upon the release button 11 being pressed to the full-pressed state S2 at point-in-time T10, and a shooting start command D2 being given, in response to the shooting start command D2, shaking correction operation such as the following is executed under the control of the shaking correction control unit 21. Specifically, a value obtained by multiplying the shaking amount VB1 obtained by integrating detection values by the angular velocity sensor 61 during a period including exposure by the value RM is calculated as an overall shaking value VB3 (ΔD) (=VB1×RM) by employing the latest value RM (e.g., RM2) obtained immediately before the shooting start command D2.

Subsequently, driving such as cancelling out the thus obtained shaking amount VB3 is executed, thereby executing shaking correction (specifically, shaking correction at the time of obtaining the main shot image) relating to the imaging device 5. Also, in a state subjected to such shaking correction, the exposure operation of the main shot image is performed by the imaging device 5 and so forth. Thus, a main shot image of which the shaking has suppressed well can be obtained.

According to the detailed configuration such as shown in FIG. 5, the imaging apparatus 1 executes operation such as shown above.

As shown in FIG. 5, each control system further includes an electronic shaking detection unit 71, integration unit 72, gain multiplication unit 73, amplitude detection unit 74, comparison unit 75, and amplitude detection unit 79.

The electronic shaking detection unit 71 employs the image data of multiple (e.g., two) time-series images obtained by the imaging device 16 and stored in the image memory 56 to detect the movement (i.e., shaking) of a subject image by employing an appropriate detection method such as the "motion vector method" or the like.

The integration unit 72 integrates movement detected by the electronic shaking detection unit 71 to calculate shaking amount VB21 on the imaging device 16. The gain multiplication unit 73 converts the shaking amount VB21 into shaking amount VB2 on the imaging device 5 by taking the difference between the focal length of the optical system relating to the imaging device 5 and the focal length of the optical system relating to the imaging device 16, and so forth into consideration.

The amplitude detection unit 74 obtains amplitude HB (the difference between the maximum value and minimum value with displacement in a predetermined direction) during a predetermined period TM of the shaking amount VB2.

Also, the amplitude detection unit 79 obtains amplitude HA (the difference between the maximum value and minimum value with displacement in a predetermined direction) during a predetermined period TM of the shaking amount VB1.

Subsequently, the comparison unit 75 obtains a ratio value RM between the amplitude HA and amplitude HB (=HB/HA). The comparison unit 75 does not update the value RM during the exposure period of the main shot image.

Also, the correction shaking amount calculation unit 67 corrects the shaking amount VB1 (ΔR) obtained by the angular velocity sensor 61 during the exposure of the shot image based on the amplitude ratio RM (e.g., RM2) before the obtaining point of a shot image (specifically, before exposure obtaining start point T10 (FIG. 11)) to calculate shaking amount VB3 (ΔD).

As described above, the shaking amount VB1 is corrected by employing the amplitude ratio RM based on the shaking amount VB1 and shaking amount VB2, and thus, the shaking amount VB3 after correction is calculated.

Subsequently, as described above, the servo control unit 68 determines driving amount for cancelling out the shaking amount VB3 calculated by the correction shaking amount calculation unit 67 to drive the shaking correction mechanism 7 by a driving signal according to the driving amount. That is to say, the servo control unit 68 drives the imaging device 5 based on the shaking amount VB3 for shaking correction to correct the shaking of a subject image on the light reception face of the imaging device 5.

According to such operation, not shaking correction so as to cancel out the uncorrected shaking amount VB1 employing only the output value of the angular velocity sensor 61 but shaking correction so as to cancel out the shaking amount VB3 subjected to correction as described above is performed. Accordingly, parallel shaking can be corrected well. Also, a live view shot image is employed for correction such as described above, so no acceleration sensor for detecting parallel shaking is employed. In particular, the imaging device 16 provided for live view use is employed for shaking detection (i.e., employed for both usages), so this arrangement is effective as compared to the case of providing acceleration sensors individually.

Note that the above-mentioned embodiment has exemplified a case wherein the overall shaking amount VB3 becomes greater than the shaking amount VB1 by the angular velocity sensor which is caused due to existence of parallel shaking, but the present invention is not restricted to this. For example, there is a case wherein the overall shaking amount VB3 becomes smaller than the shaking amount VB1 by the angular velocity sensor (i.e., RM<1) depending on the position of the rotation center of hand shaking, or the like. Even in such a case, shaking correction such as cancelling out the shaking amount VB3 calculated as a smaller value than the shaking amount VB3 can be performed according to the same operation as described above. Accordingly, the shaking of the imaging apparatus 1 can be corrected well.

6. Other Arrangements

Description has been made of an embodiment of the present invention so far, but the present invention is not restricted to the above. For example, the above-mentioned embodiment has exemplified the case of employing the SIDMs as actuators 7x and 7y, but the present invention is not restricted to this. For example, another driving source such as an ultrasonic motor or the like may be employed.

Also, the above-mentioned embodiment has exemplified the case of correcting the shaking of the imaging apparatus 1 by driving the imaging device 5, but the present invention is not restricted to this, and accordingly, another type of optical shaking correction may be performed. For example, the shaking of the imaging apparatus 1 may be corrected by employing a shaking correction mechanism for driving a lens within the shooting optical system.

Also, the above-mentioned embodiment has exemplified the case wherein the imaging device 16 for obtaining live view images is provided separately from the imaging device 5, but the present invention is not restricted to this, and accordingly, a live view image may also be obtained by the imaging device 5 for obtaining still images (for obtaining the main shot images). For example, let us assume a case wherein the mirror mechanism 6 is set to a mirror-up state at the time of determining a picture composition, and also the mechanical shutter 4 is opened, a subject image from the photography lens unit 3 is made to reach the imaging device 5, thereby realizing a live view by the imaging device 5. In this case, the electronic shaking detection unit 71 employs the image data of multiple (e.g., two) time-series images obtained by the imaging device 5 and stored in the image memory 56 to detect the movement (i.e., shaking) of a subject image by employing an appropriate detection method such as the "motion vector method" or the like. Subsequently, the integration unit 72 integrates the shaking, and the gain multiplication unit 73 multiplies this by appropriate gain. According to such operation, the same shaking amount VB2 as described above can be obtained. Further, similar to the above-mentioned embodiment, the value RM and so forth are obtained, and shaking amount VB3 is calculated to perform shaking correction at the time of obtaining the main shot image executed in response to the shooting start command D2, whereby the shaking of a subject image on the imaging device 5 can be suppressed well.

Note that, with such a modification, no live view image by the imaging device 5 can be obtained at the time of exposure for obtaining the main shot image (shortly put, at the time of obtaining the main shot image). Therefore, no live image can be employed for shaking correction at the time of shooting the main shot image. Accordingly, as described above, it is desirable to perform shaking correction by employing the shaking amount VB3 obtained by correcting the shaking amount VB1 by the angular velocity sensor 61. It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:

an imaging device configured to subject an optical subject image to photoelectric conversion to generate an image signal;

an angular velocity sensor configured to detect angular velocity with said imaging apparatus;

a first shaking amount calculation section configured to integrate detection values obtained by said angular velocity sensor to calculate first shaking amount of said imaging apparatus;

a second shaking amount calculation section configured to calculate second shaking amount of said imaging apparatus based on image data obtained by said imaging device;

a third shaking amount calculation section configured to correct said first shaking amount to calculate third shaking amount of said imaging apparatus based on first amplitude which is a fluctuation range relating to said first shaking amount during a predetermined period, and second amplitude which is a fluctuation range relating to said second shaking amount during said predetermined period; and a correction control section configured to correct the shaking of said imaging apparatus based on said third shaking amount, wherein said third shaking amount calculation section correct said first shaking amount according to an amplitude ratio between said first amplitude and said second amplitude to calculate said third shaking amount.

2. The imaging apparatus according to claim 1, wherein said third shaking amount calculation section, based on said amplitude ratio before an obtaining point of a main shot image, correct said first shaking amount obtained during exposure of said main shot image to calculate said third shaking amount.

3. The imaging apparatus according to claim 1, wherein said second shaking amount calculation section calculate said second shaking amount based on a time-series image obtained by said imaging device;

and wherein said imaging device obtains a main shot image in response to a shooting start command;

and wherein said correction control section correct the shaking of said imaging apparatus at the time of obtaining said main shot image based on said third shaking amount.

4. The imaging apparatus according to claim 1, further comprising:

a second imaging device configured to obtain the main shot image, which is another imaging device different from said first imaging device which is said imaging device;

wherein said second shaking amount calculation section calculate said second shaking amount based on said time-series image obtained by said first imaging device;

and wherein said correction control section correct the shaking of said imaging apparatus at the time of obtaining said main shot image based on said third shaking amount.

5. An imaging apparatus comprising:
an imaging device configured to subject an optical subject image to photoelectric conversion to generate an image signal;
an angular velocity sensor configured to detect angular velocity with said imaging apparatus;
a first shaking amount calculation unit configured to integrate detection values obtained by said angular velocity sensor to calculate first shaking amount of said imaging apparatus;
a second shaking amount calculation unit configured to calculate second shaking amount of said imaging apparatus based on image data obtained by said imaging device;
a third shaking amount calculation unit configured to correct said first shaking amount to calculate third shaking amount of said imaging apparatus based on first amplitude which is a fluctuation range relating to said first shaking amount during a predetermined period, and second amplitude which is a fluctuation range relating to said second shaking amount during said predetermined period; and
a correction control unit configured to correct the shaking of said imaging apparatus based on said third shaking amount,
wherein said third shaking amount calculation unit is configured to correct said first shaking amount according to an amplitude ratio between said first amplitude and said second amplitude to calculate said third shaking amount.

* * * * *